United States Patent [19]

Stockton

[11] Patent Number: 5,418,400
[45] Date of Patent: May 23, 1995

[54] INTEGRATED GENERATOR AND STARTER MOTOR

[75] Inventor: Thomas R. Stockton, Ann Arbor, Mich.

[73] Assignee: Ford Motor Company, Dearborn, Mich.

[21] Appl. No.: 172,970

[22] Filed: Dec. 27, 1993

[51] Int. Cl.⁶ .................... F02N 11/04; H02K 7/10
[52] U.S. Cl. ........................ 290/46; 74/7 E; 74/467; 290/22; 290/31; 475/13; 310/83; 310/267
[58] Field of Search .............. 74/467; 290/22, 31, 290/46; 310/83, 267; 475/13

[56] References Cited

U.S. PATENT DOCUMENTS

| | | | |
|---|---|---|---|
| 1,148,884 | 8/1915 | Apple | 290/46 |
| 1,307,230 | 6/1919 | von Zweigbergk et al. | 290/2.2 |
| 1,770,468 | 7/1930 | Ford | 290/46 |
| 3,270,207 | 8/1966 | Stockton | 290/38 R |
| 4,418,777 | 12/1983 | Stockton | 74/467 |
| 4,862,009 | 8/1989 | King | 290/22 |
| 5,126,582 | 6/1992 | Sugiyama | 290/46 |

FOREIGN PATENT DOCUMENTS 515742  5/1920  France.
355391  6/1992  Germany.

Primary Examiner—A. D. Pellinen
Assistant Examiner—Robert Lloyd Hoover
Attorney, Agent, or Firm—Mark S. Sparsch; Roger L. May

[57] ABSTRACT

A combination generator and starter motor includes a rotor with an internal ring gear, a plurality of dual pinion gears which mesh with the rotor and two sun gears which mesh with the dual pinion gears. A large torque multiplication from the rotor to one of the sun gears is provided when the combination generator and starter motor operates as a starter motor. A one-to-one ratio of rotation between that sun gear and the rotor is provided when the combination generator and starter motor operates as a generator.

13 Claims, 2 Drawing Sheets

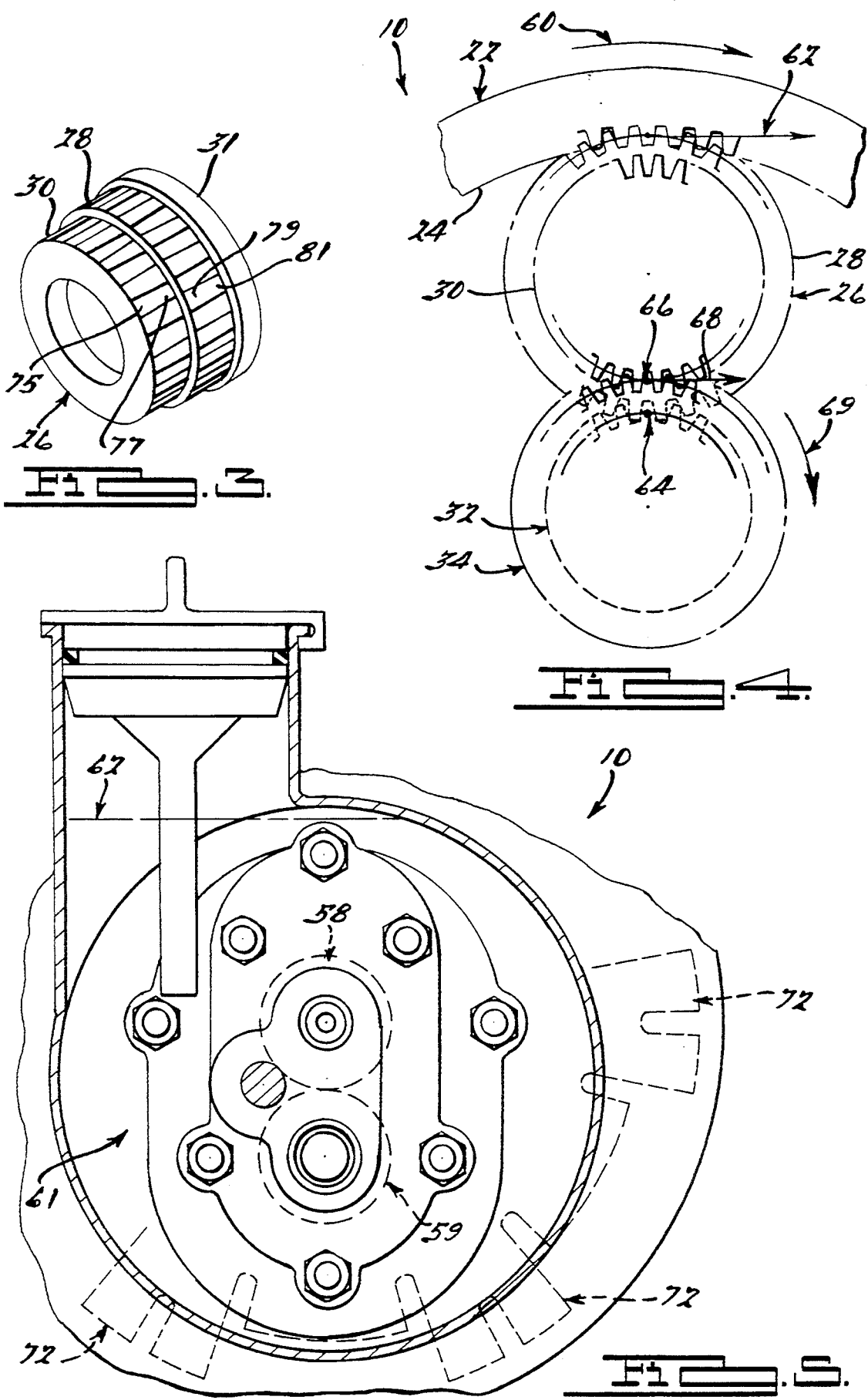

INTEGRATED GENERATOR AND STARTER MOTOR

BACKGROUND OF THE INVENTION

1. Field of the Invention

This invention relates to a combined generator and starter motor for an automobile.

2. Background of the Relevant Art

Electrical generators and starter motors are separate parts on most automobiles with internal combustion engines. However, several goals in the design of automobiles would be furthered by combining the generator and the starter motor on an automobile.

One such design goal is weight reduction. A combined generator and starter motor can reduce a vehicle's weight by eliminating components which are redundant to the generator and the starter motor. Examples of such components are the external case which each device has and the rotors and coils which each device also has. A combined generator and starter motor would be able to eliminate some of the components which are redundant to the two devices, providing the potential for vehicle weight reduction.

Another goal in the design of vehicles is cost reduction. A combined generator and starter motor would potentially cost less than the sum of the two devices individually. This cost reduction would be achieved through the elimination of redundant parts, the same elimination which could help reduce vehicle weight. Also, administrative costs of vehicle manufacturers can be reduced because only one part (a combined generator and starter motor) instead of two (a generator and a starter motor) needs to be purchased, stored, made available as a service part, and so on.

Yet another goal in the design of vehicles is reduction of vehicle assembly complexity. Fewer parts which go into the assembly of a vehicle often translate into lower cost for assembly labor to assemble the vehicle. Also, the likelihood of assembly mistakes is reduced if there are fewer parts to assemble into the vehicle.

Still another goal in the design of vehicles is high reliability. Axiomatic in reliability theory is the principle that greater complexity tends to cause lower reliability. A combined generator and starter motor will likely have fewer total components than the two devices separately. The combination of the generator and the starter motor would therefore have the potential for providing improved overall reliability of the vehicle.

U.S. Pat. No. 5,126,582 discloses a combined starter-generator. This device employs a basic planetary gear set. The device contains a rotor, the hub of which has external teeth to form a sun gear. Pinion gears attached to a carrier surround the sun gears. Finally, a stator contains an inner toothed surface which acts as a ring gear.

Although the invention in U.S. Pat. No. 5,126,582 does provide a combined generator and starter motor, it has three less-than-optimal features. First, the gear set, being a simple planetary gear set, does not provide as much speed reduction (and torque multiplication) as is potentially needed in some engine cranking applications. Second, in generating mode, the pinion gears continually revolve around the sun gear. Although the pinion gears are not transmitting torque (torque is transmitted directly from the engine through a shaft to the rotor), the continual rotation of the pinion gears can be a source of failure. Finally, the invention contains two air gaps, one between the rotor and a field coil and the other between the rotor and an armature. Two air gaps can cause an unnecessary loss of magnetic flux inside a motor or a generator, resulting in reduced efficiency.

Therefore, a combined generator and starter motor which provides large torque multiplication in starter motor mode, which reduces gear rotation in generator mode, and which has a single air gap will provide advantages over the prior art.

SUMMARY OF THE INVENTION

The present invention provides a combination generator and starter motor. The combination generator and starter motor comprises a rotor with an inner surface which further comprises teeth. The inner surface of the rotor thus forms a ring gear. The combination generator and starter motor further comprises a plurality of dual pinion gears, each dual pinion gear having a first pinion gear portion and a second pinion gear portion. Each first pinion gear portion and second pinion gear portion in a dual pinion gear are joined so as to be forced to rotate together. The first pinion gear portion of each dual pinion gear is meshed with the ring gear. The combination generator and starter motor also comprises a first sun gear meshed with each of the first pinion gear portions. The combination generator and starter motor further comprises a second sun gear sharing a common axis of rotation with the first sun gear. The second sun gear is meshed with each second pinion gear portion of each dual pinion gear. The combination generator and starter motor also comprises a first clutch means for preventing rotation of the first sun gear in one direction. Additionally, the combination generator and starter motor comprises a second clutch means for preventing the first sun gear from rotating faster than the second sun gear in a direction opposite from the direction in which the first sun gear is prevented from rotating by the first clutch. The combination generator and starter motor further comprises means for transmitting torque to and from the second sun gear.

The present invention provides numerous advantages with respect to the prior art. First, the invention allows integration of a starter motor and a generator of a vehicle. Second, the present invention allows for a large gear ratio between the ring gear and the second sun gear. Such a large gear ratio is desirable for providing large torque multiplication for applications such as a starter motor for cranking a vehicle engine. Third, the present invention allows for the inclusion of a single air gap, advantageous for high efficiency of motors and generators. Finally, the present invention provides high durability by eliminating pinion gear rotation in generator mode, the mode in which a combination generator and starter motor will most frequently operate.

BRIEF DESCRIPTION OF THE DRAWINGS

FIG. 3 is a perspective view of the dual pinion gears of the starter-alternator of FIG. 1.

FIG. 4 is a second schematic representation of the gears of the starter-alternator of FIG. 1.

FIG. 5 is a right end view of the starter-alternator of FIG. 1.

DETAILED DESCRIPTION OF THE PREFERRED EMBODIMENT

Figure 1:
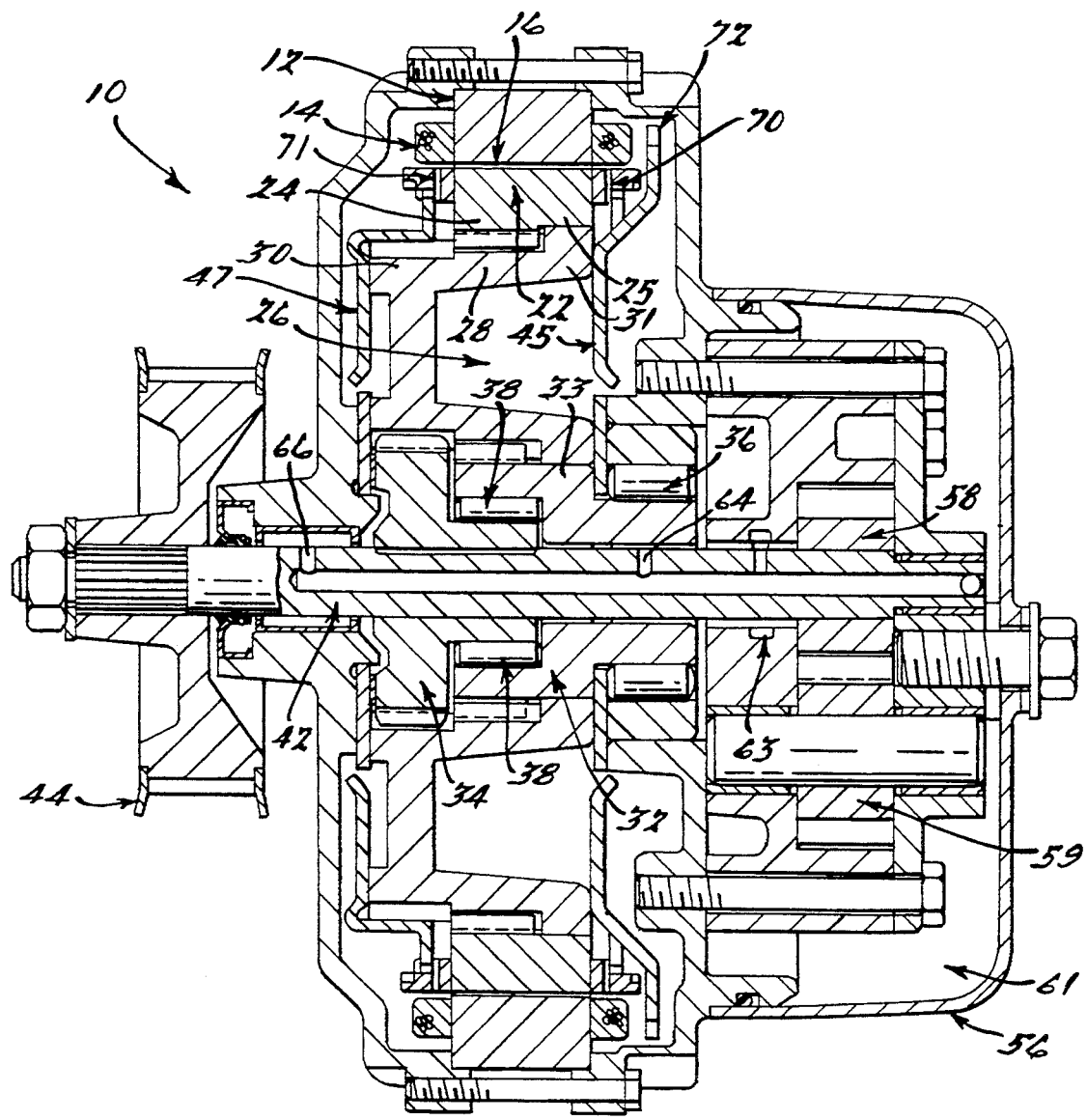
FIG. 1 is a side view of one embodiment of the present invention, a starter-alternator.
Figure 2:
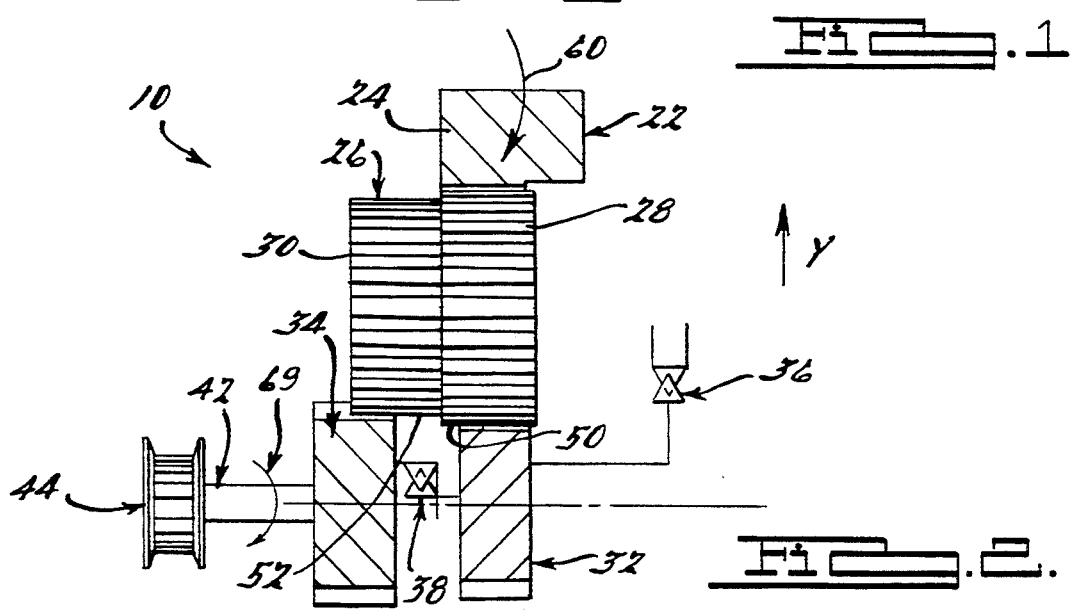
FIG. 2 is a schematic representation of the gears of the starter-alternator of FIG. 1.

Referring to FIG. 1 and FIG. 2, starter-alternator 10 of the preferred embodiment of the present invention is depicted. Preferably, starter-alternator 10 is a three-phase induction machine. Starter-alternator 10 contains a stator 12. Stator 12 has a field coil 14 with windings and a power coil (not shown), also with windings. In addition, starter-alternator 10 contains a rotor 22 and an air gap 16 between rotor 22 and field coil 14. Application of three-phase power to the windings of stator 12 causes rotor 22 to rotate, as is well-known in the art of induction motors. Conversely, rotating rotor 22 causes three-phase electrical power to be generated in the power windings of stator 12, a result which is well-known in the art of induction generators.

Rotor 22 contains an interior surface. A portion of that interior surface has teeth. These teeth extend around the entire circumference formed by the interior surface of rotor 22. The teeth thus form a ring gear 24. Starter-alternator 10 further comprises a plurality of dual pinion gears 26. The preferred number of dual pinion gears 26 is three or four, a typical quantity of pinion gears in a planetary gear set. These dual pinion gears 26 each comprise two pinion portions, a first pinion portion 28 and a second pinion portion 30. Referring additionally to FIG. 3, each pinion portion 28 and 30 comprises external teeth. It is advantageous for each first pinion portion 28 and second pinion portion 30 to contain the same number of teeth, each tooth of each first pinion portion 28 further being aligned with a tooth of each second pinion portion 30. The equal number of teeth and the tooth alignment allow dual pinion gears 26 to be fabricated by the economical method of powdered metal fabrication. Each first pinion portion 28 of each dual pinion gear 26 is meshed with ring gear 24.

Referring again to FIGS. 1 and 2, starter-alternator 10 further comprises a first sun gear 32. First sun gear 32 is mounted so as to be able to rotate around a shaft 42. However, first sun gear 32 is not rigidly mounted to shaft 42, first sun gear 32 therefore being able to rotate independently from rotation of shaft 42. First sun gear 32 is meshed with each first pinion portion 28 of each dual pinion gear 26.

Again referring additionally to FIG. 3, it should be noted that in addition to gear teeth, dual pinion gears 26 comprise a smooth surface 31. Also, in addition to teeth of ring gear 24, the interior surface of rotor 22 comprises a smooth surface 25. In addition, first sun gear 32 comprises a smooth surface 33 in addition to gear teeth. The smooth surfaces herein described provide rolling contact between rotor 22, dual pinion gears 26, and first sun gear 32. Such rolling contact provides superior consistency of the width of air gap 16. Relying simply on the relatively loose meshing of the teeth of ring gear 24, first pinion portions 28 and first sun gear 32 would provide less consistency of the width of air gap 16. Consistency of air gap width provides improved efficiency of a generator and of a motor.

Referring again to FIG. 1, starter-alternator 10 additionally comprises a second sun gear 34. As with first sun gear 32, second sun gear 34 is mounted about shaft 42. However, second sun gear 34 is rigidly mounted to shaft 42 so that second sun gear 34 and shaft 42 rotate together. Also mounted to shaft 42 is pulley 44. When starter-alternator 10 operates in alternator mode, pulley 44 transmits torque from the engine through a conventional drive belt to starter-alternator 10. When starter-alternator 10 operates in starter motor mode, however, pulley 44 transmits torque from starter-alternator 10 to the engine, through the same drive belt.

Referring additionally to FIG. 2, starter-alternator 10 further comprises a starter one-way clutch 36. One-way clutch 36 is preferably a roller-type clutch well-known to those skilled in the art. As shown schematically in FIG. 2, starter one-way clutch 36 prevents rotation of first sun gear 32 in one direction, the clockwise direction when viewed from the right in FIG. 2. First sun gear 32 is free to rotate in the opposite direction.

Starter-alternator 10 further comprises an alternator one-way clutch 38. Alternator one-way clutch 38 is also preferably a roller-type clutch well-known to those skilled in the art. As shown in FIG. 2, alternator one-way clutch 38 allows torque transmission between first sun gear 32 and second sun gear 34 in one direction only. In the second direction, alternator one-way clutch 38 overruns, transmitting no torque between first sun gear 32 and second sun gear 34.

The operation of starter-alternator 10 will now be described with reference to FIG. 2 and FIG. 4. When the vehicle engine is being started, starter-alternator 10 operates as a motor to crank the engine. Starter-alternator 10 takes three-phase electrical energy as an input. As in ordinary electric motor operation, the input of electrical energy causes rotor 22 to rotate. The rotation of rotor 22 is depicted by arrow 60. The rotation of rotor 22 (and consequently of ring gear 24 as well) causes first pinion portions 28 of dual pinion gears 26 to rotate. A tangential velocity, represented by arrow 62, exists at the point of contact between ring gear 24 and first pinion portion 28. Because second pinion portions 30 of dual pinion gear 26 are rigidly connected to first pinion portions 28, second pinion portions 30 rotate along with first pinion portions 28.

First sun gear 32 tends to be driven by first pinion portion 28. However, starter one-way clutch 36 prevents this rotation of first sun gear 32. First sun gear 32 therefore is locked and does not rotate. Because first sun gear 32 is locked, first pinion portion has an instant center 65 at the point of contact between first pinion portion 28 and first sun gear 32. First pinion portion 28 revolves or "walks" about that instant center. By definition, the tangential velocity at instant center 65 is zero.

Contact point 67 between second pinion portion 30 and second sun gear 34 has a tangential velocity, represented by arrow 68 (FIG. 4). This velocity is small relative to the tangential velocity 62 of ring gear 24. As a result, second sun gear 34 rotates very slowly relative to the rotation of ring gear 24. This large speed reduction necessarily implies a large torque multiplication from ring gear 24 to second sun gear 34, an advantageous result for a starter motor. Because second sun gear 34 is rigidly mounted to shaft 42, the rotation of second sun gear 34 causes torque to be transmitted through shaft 42 to pulley 44. The torque is then transmitted via a drive belt to crank the engine. Rotation of second sun gear 34, shaft 42 and pulley 44 is in the direction depicted by arrow 69.

A calculation of the gear ratio of starter-alternator 10 when operated as a starter motor reveals that the gear ratio is as follows:

$$\frac{1 + \frac{S_1}{S_1 + 2P_1}}{1 - \frac{S_1}{S_2} \cdot \frac{P_2}{P_1}}$$

where $S_1$ is the number of teeth in first sun gear 32, $S_2$ is the number of teeth in second sun gear 34, $P_1$ is the number of teeth in first pinion portions 28 of dual pinion gears 26, and $P_2$ is the number of teeth in second pinion portions 30 of dual pinion gears 26.

As an example, consider $S_1 = 26$ teeth, $S_2 = 32$ teeth, $P_1 = 22$ teeth and $P_2 = 22$ teeth. The torque multiplication between ring gear 24 and pulley 44 will then be 7.314.

When starter-alternator 10 operates as an alternator, on the other hand, the vehicle engine provides torque to drive starter-alternator 10. This torque is provided through the aforementioned drive belt to pulley 44. The torque causes shaft 42 to rotate in the direction depicted by arrow 69. Because second sun gear 34 is rigidly connected to shaft 42, second sun gear 34 rotates as well. Second sun gear 34 tends to rotate first pinion portions 28 of dual pinion gears 26. Second pinion portions 30 of dual pinion gears 26 tend to drive first sun gear 32. Due to the gear ratios involved, first sun gear 32 tends to rotate faster than second sun gear 34. As a result, alternator clutch 38 locks, causing first sun gear and second sun gear to rotate together, in the direction depicted by arrow 69. When this occurs, the entire gear set rotates at the same rotational speed as pulley 44 and shaft 42. As a result, rotor 22 rotates at this same speed, in the direction depicted by arrow 60. Starter-alternator 10 thus generates electricity. No rotation of dual pinion gears 26 occurs in this instance.

It should be noted that in the preferred embodiment, there is no pinion carrier within starter-alternator 10. Generally, in a planetary gear set, the pinion gears are retained on a pinion carrier. Typically, this pinion carrier helps maintain pinion gear spacing, prevents twisting moments from cocking the pinions, and provides means for transmitting torque to and/or from the planetary gear set. However, in starter-alternator 10, there is no need to transfer torque by means of a carrier. As a result, the carrier is omitted. Spacing of the dual pinion gears 26 is simply maintained by appropriate selection of number of teeth. There is, however, a twisting moment which tends to be introduced to dual pinion gears 26. This is described with reference to FIG. 2. Corresponding teeth on first pinion portions 28 and second pinion portions 30 have loads in opposite directions on them. During starting motor mode, tooth 50 on first pinion portion 28 is loaded on the face of tooth 50 facing into the paper (that is, the load on tooth 50 is in the direction coming out of the paper). On the other hand, tooth 52 on second pinion portion 30 is loaded on the face of tooth 52 facing out of the paper (that is, the load on tooth 52 is in the direction going into of the paper). These two loads on teeth 50 and 52 cause a twisting moment about the axis labelled "Y" in FIG. 2. Dual pinion gears 26 thus have a tendency to twist out of proper alignment. A twisting moment in the opposite direction exists when starter-alternator 10 operates in alternator mode.

In the preferred embodiment of this invention, the tendency of dual pinion gears 26 to twist is prevented in two ways. First, close-fitting thrust plates 45 and 47 (FIG. 1) keep dual pinion gears 26 from twisting. Also, the teeth of dual pinion gears 26 can be slightly tapered. This tapering will be described with reference to FIG. 3. Consider first the gear tooth with ends 75 and 77. This gear tooth is slightly tapered such that the gear tooth is thicker at end 77 than at end 75. Preferably, the tapering amounts to only a few thousandths of an inch difference in tooth thickness between end 75 and end 77. Similarly, the gear tooth with ends 79 and 81 is slightly tapered such that the gear tooth is thicker at end 79 than at end 81. Because of the tapering, the majority of the load on the teeth of dual pinion gear 26 is on the thicker portions of the teeth (nearest end 77 and end 79), which are close together. The result is a moment arm of minimal length and therefore a minimal twisting moment on dual pinion gear 26.

It should be noted that a pinion carrier can be used with or without the aforementioned gear tooth tapering to help counteract the twisting moment herein described. Such inclusion would not depart from the spirit of this invention.

With respect to the construction of ring gear 24, one more detail should be noted. As previously noted, ring gear 24 is located on the interior surface of rotor 22 (FIGS. 1, 2, and 4). Typically, to reduce eddy current losses, rotors are constructed of laminations of thin steel. That construction can also be used in the present invention, even though rotor 22 also contains the teeth of ring gear 24. The large torque multiplication provided from ring gear 24 to second sun gear 34 by the present invention causes a very small torque to be experienced by ring gear 24. As a result, laminated sheet metal teeth for ring gear 24 will be strong enough to withstand the loading placed upon them.

In the preferred embodiment, starter-alternator 10 is integrated also with a power steering pump. Power steering pump portion 56 of starter-alternator 10 is illustrated in FIGS. 1 and 5. Power steering pump portion 56 illustrated in those Figures generally depicts an external-gear-type power steering pump. Any other power steering pump would work as well. Integration of the power steering pump allows a portion of power steering fluid to be diverted to help lubricate gears 24, 26, 32, and 34 and to help cool field coil 14.

Power steering pump portion 56 contains two external gears, a configuration well-known to those skilled in the art. First pump gear 58 is rotated by shaft 42. Second pump gear 59 is in turn driven by first pump gear 58. Power steering pump portion 56 further comprises a reservoir 61 which contains power steering fluid 62.

The portion of the power steering fluid to be diverted for cooling and lubrication is pumped into the center of shaft 42 through inlet 63. The fluid then passes out of the center of shaft 42 through outlets 64 and 66. The fluid then works its way centrifugally from shaft 42 radially outward, lubricating starter one-way clutch 36 and alternator one-way clutch 38. The fluid then lubricates first sun gear 32, second sun gear 34, and dual pinion gears 26. Finally, the fluid passes through slots 68 and 70 in rotor 22, spraying on the windings of field coil 14.

Because gravity eventually causes the diverted power steering fluid to collect at the bottom of the starter-alternator gear set, a slinger 72 raises the oil back up where it can return via a trough (not shown) to reservoir 61 in power steering pump portion 56.

Various modifications and variations will no doubt occur to those skilled in the arts to which this invention pertains. Such variations which generally rely on the teachings through which this disclosure has advanced the art are properly considered within the scope of this invention. For example, torque may be transmitted to and from starter-alternator 10 by means other than pulley 44 and a drive belt. Shaft 42 can be coupled to the vehicle engine by gearing, by a chain drive, or by other means. As a second example, starter one-way clutch 36 and alternator one-way clutch 38 can be other than the roller-type clutches described as part of the preferred embodiment of this invention. Many clutch mechanisms well-known in the art, for example sprag-type one-way clutches, can perform the functions performed by starter one-way clutch 36 and alternator one-way clutch 38. As another example, starter-alternator 10 is shown in this disclosure to be a threephase induction machine. Other types of machines such as direct current machines, synchronous machines, and machines with various numbers of phases call employ the teachings of this disclosure to advantage. As a final example, other means of lubricating gears 24, 26, 32 and 34 and cooling field coil 14 than those disclosed as part of the preferred embodiment can be employed, to the extent that lubrication and cooling are required. For example, the alternator art recognizes air cooling of alternator coils. Further, the gears of starter-alternator 10 call be lubricated by a mechanism and a lubricant unique to starter-alternator 10. Integration of the power steering pump and use of diverted power steering fluid is not the only means of lubrication and cooling available.

What is claimed is:

1. A combination generator and starter motor comprising:
   a rotor with an inner surface, said inner surface comprising teeth, whereby said inner surface of said rotor forms a ring gear;
   a plurality of dual pinion gears, each said dual pinion gear comprising a first pinion gear portion and a second pinion gear portion, each said first pinion gear portion and said second pinion gear portion in a said dual pinion gear sharing a common axis and joined so as to be forced to rotate together, each said first pinion gear portion being meshed with said ring gear;
   a first sun gear, said first sun gear meshed with each said first pinion gear portion;
   a second sun gear, said second sun gear meshed with each said second pinion gear portion, said second sun gear further sharing a common axis of rotation with said first sun gear;
   first clutch means for preventing rotation of said first sun gear in one direction;
   second clutch means for locking said first sun gear to said second sun gear when said first sun gear tends to rotate faster than said second sun gear in a direction opposite from said one direction in which said first sun gear is prevented from rotating by said first clutch means; and
   means for transmitting torque to and from said second sun gear.

2. The combination generator and starter motor recited in claim 1 wherein each said first pinion portion in each said dual pinion gear has a pitch diameter larger than that of each said second pinion portion.

3. The combination generator and starter motor recited in claim 2 wherein each said first pinion portion and second pinion portion in each said dual pinion gear have an equal number of teeth.

4. The combination generator and starter motor recited in claim 3 wherein the teeth of each said first pinion portion and of each said second pinion portion are substantially aligned with one another.

5. The combination generator and starter motor recited in claim 1 further comprising retaining means for preventing twisting of said dual pinion gears out of alignment with said ring gear, said first sun gear and said second sun gear.

6. The combination generator and starter motor recited in claim 5 wherein said retaining means comprise tapered teeth of each said first pinion gear portion and second pinion gear portion.

7. The combination generator and starter motor recited in claim 5 wherein said retaining means comprise thrust plates disposed adjacent to said dual pinion gears.

8. The combination generator and starter motor recited in claim 1 wherein said ring gear, said dual pinion gears, and said first sun gear further comprise roller surfaces arranged such that the roller surface of said ring gear is in rolling contact with said roller surfaces of said dual pinion gears and such that the roller surface of said first sun gear is also in rolling contact with said roller surfaces of said dual pinion gears.

9. The combination generator and starter motor recited in claim 1 wherein said teeth of said ring gear each comprise a plurality of layers of sheet metal.

10. The combination generator and starter motor recited in claim 1 further comprising a power steering pump portion.

11. The combination generator and starter motor recited in claim 10 further comprising means for diverting power steering fluid from said power steering pump portion to said first sun gear, said second sun gear, said dual pinion gears, and said ring gear.

12. The combination generator and starter motor recited in claim 11 further comprising a field coil and means for diverting power steering fluid to said field coil.

13. A combination generator and starter motor comprising:
   a rotor with an inner surface, said inner surface comprising teeth which each comprise a plurality of layers of sheet metal, whereby said inner surface of said rotor forms a ring gear;
   a plurality of dual pinion gears, each said dual pinion gear comprising a first pinion gear portion and a second pinion gear portion, each said first pinion gear portion and said second pinion gear portion in a said dual pinion gear sharing a common axis and joined so as to be forced to rotate together, each said first pinion portion in each said dual pinion gear having a pitch diameter larger than that of each said second pinion portion, each said first pinion portion and second pinion portion in each said dual pinion gear having an equal number of teeth, the teeth of each said first pinion portion and of each said second pinion portion being substantially aligned with one another, the teeth of each said first pinion gear portion and each said second pinion gear portion being tapered, each said first pinion gear portion being meshed with said ring gear;
   a first sun gear, said first sun gear meshed with each said first pinion gear portion;
   a second sun gear, said second sun gear meshed with each said second pinion gear portion, said second sun gear further sharing a common axis of rotation with said first sun gear;

wherein said ring gear, said dual pinion gears, and said first sun gear further comprise roller surfaces arranged such that the roller surface of said ring gear is in rolling contact with said roller surfaces of said dual pinion gears and such that the roller surface of said first sun gear is also in rolling contact with said roller surfaces of said dual pinion gears;

first clutch means for preventing rotation of said first sun gear in one direction;

second clutch means for locking said first sun gear to said second sun gear when said first sun gear tends to rotate faster than said second sun gear in a direction opposite from said one direction in which said first sun gear is prevented from rotating by said first clutch means;

means for transmitting torque to and from said second sun gear;

thrust plates disposed so as to prevent twisting of said dual pinion gears out of alignment with said ring gear;

a power steering pump portion;

means for diverting power steering fluid from said power steering pump portion to said first sun gear, said second sun gear, said dual pinion gears, and said ring gear;

a field coil; and means for diverting power steering fluid to said field coil.

* * * * *